US006449397B1

(12) United States Patent
Che-Chu

(10) Patent No.: US 6,449,397 B1
(45) Date of Patent: Sep. 10, 2002

(54) IMAGE PROCESSING SYSTEM FOR SCANNING A RECTANGULAR DOCUMENT

(75) Inventor: Yang Che-Chu, Chang-Hua Hsien (TW)

(73) Assignee: Mustek Systems Inc., Hsin-Chu (TW)

( * ) Notice: Subject to any disclaimer, the term of this patent is extended or adjusted under 35 U.S.C. 154(b) by 0 days.

(21) Appl. No.: 09/285,710

(22) Filed: Apr. 5, 1999

(51) Int. Cl.[7] .............................. G06K 9/32; G06K 9/36; H04N 1/04; H04N 1/42
(52) U.S. Cl. ...................... 382/289; 382/296; 382/295; 382/293; 382/291; 358/497; 358/496; 358/474
(58) Field of Search ................................. 382/289, 287, 382/275, 293, 291, 295, 296, 303, 307, 309, 297, 312–315, 317, 319; 356/138; 702/150; 358/474, 496, 497, 486, 488

(56) References Cited

U.S. PATENT DOCUMENTS

| 4,926,490 | A | * | 5/1990 | Mano | 382/177 |
| 5,517,587 | A | * | 5/1996 | Baker et al. | 382/296 |
| 5,563,403 | A | * | 10/1996 | Bessho et al. | 250/208.1 |
| 5,761,328 | A | * | 6/1998 | Solberg et al. | 382/113 |
| 5,901,253 | A | * | 5/1999 | Tretter | 382/289 |
| 5,940,544 | A | * | 8/1999 | Nako | 382/293 |
| 6,191,405 | B1 | * | 2/2001 | Mishima et al. | 250/208.1 |

* cited by examiner

*Primary Examiner*—Leo Boudreau
*Assistant Examiner*—Yosef Kassa
(74) *Attorney, Agent, or Firm*—Winston Hsu

(57) ABSTRACT

The present invention provides an image processing system for scanning a rectangular document. The system comprises a scanner with a scanning module and a computer. The computer has a memory, a processor, a scanner control program, and an image processing program. Depression of a start button generates a start signal that prompts the image processing system to rotate the document image from the scanned rectangular document by a tilting angle as well as to correct the image shape based on angle variation. This produces a straight and rectangular document image.

4 Claims, 3 Drawing Sheets

IMAGE PROCESSING SYSTEM FOR SCANNING A RECTANGULAR DOCUMENT

BACKGROUND OF THE INVENTION

1. Field of the Invention

The present invention relates to an image processing system, and more particularly, to an image processing system for scanning a rectangular document.

2. Description of the Prior Art

Scanners have rapidly gained popularity through their use of converting image signals into input data in computer systems. A typical scanner comprises a housing with a transparent platform installed on its top on which a document may be placed and scanned. Light from the document is transformed into a corresponding image signal. The scanning module is composed of many intricately arranged optical components such that optical pathways are very precise. However, during the trauma of shipping and handling, the position of the scanning module may become shifted leading to the scanned image with variation in angles. Of course, if the user places the document on the transparent platform improperly, an image with a tilting angle may be resulted.

Regardless of whether the position of the scanning module is shifted or the user places the document on the transparent platform improperly, either situation will lead to a skewed document image and lower quality of the scan. Correction of the skewed document image usually requires the use of image processing programs. However, use of these programs is tedious and labor-intensive even for graphic design specialists.

SUMMARY OF THE INVENTION

It is therefore a primary objective of the present invention to provide an image processing system for automatically correcting the skewed document image to solve the above mentioned problem.

In a preferred embodiment, the present invention provides an image processing system comprising:

a scanner comprising a scanning module for scanning a rectangular document and generating corresponding image signals, the rectangular document comprising four right angles, the image signals comprising a document image of the document in it; and a computer connected to the scanner comprising:
  a memory for storing programs and files;
  a processor for executing the programs stored in the memory;
  a scanner control program stored in the memory for controlling operations of the scanner and storing the image signals generated by the scanner into a main image file; and
  an image processing program stored in the memory for detecting a tilting angle of the document image in the main image file over which the document image is tilted about the tilting angle from an upright position and also angle variation of at least one right angle of the document image, and for correcting the document image to generate a rectangular and upright document image of the document according to the tilting angle and the angle variation of the document image.

It is an advantage of the present invention that the image processing system is designed to scan a rectangular document while easily and automatically correcting the skewed document image.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
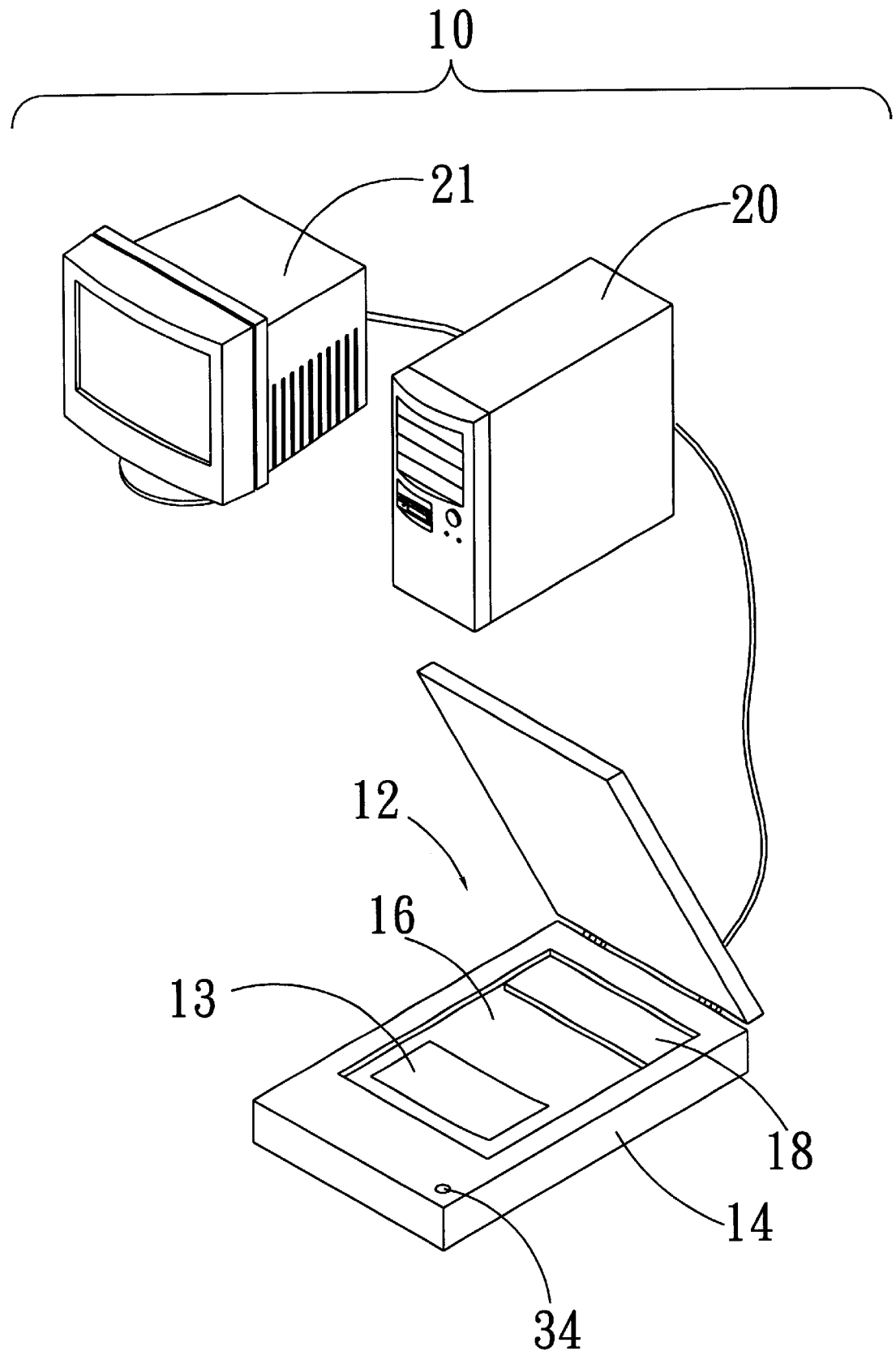
FIG. 1 is a perspective diagram of the image processing system for scanning a rectangular document according to the present invention.

Please refer to FIG. 1. FIG. 1 shows the image processing system 10 according to the present invention. The image processing system 10 comprises a scanner 12 to scan the document image and generate the corresponding image signal; a computer 20 connected to the scanner 12 for dealing with the image signal; and a monitor 21 to display the document image. The scanner 12 comprises a housing 14 having a transparent platform 16 on its top for placing the document 13 to be scanned, a scanning module 18 movably installed in the housing 14 for scanning the document 13 and generating the corresponding image signal, and a button 34 outside the housing 14 for generating a start signal to initiate the automatic processing signal.

Figure 2:
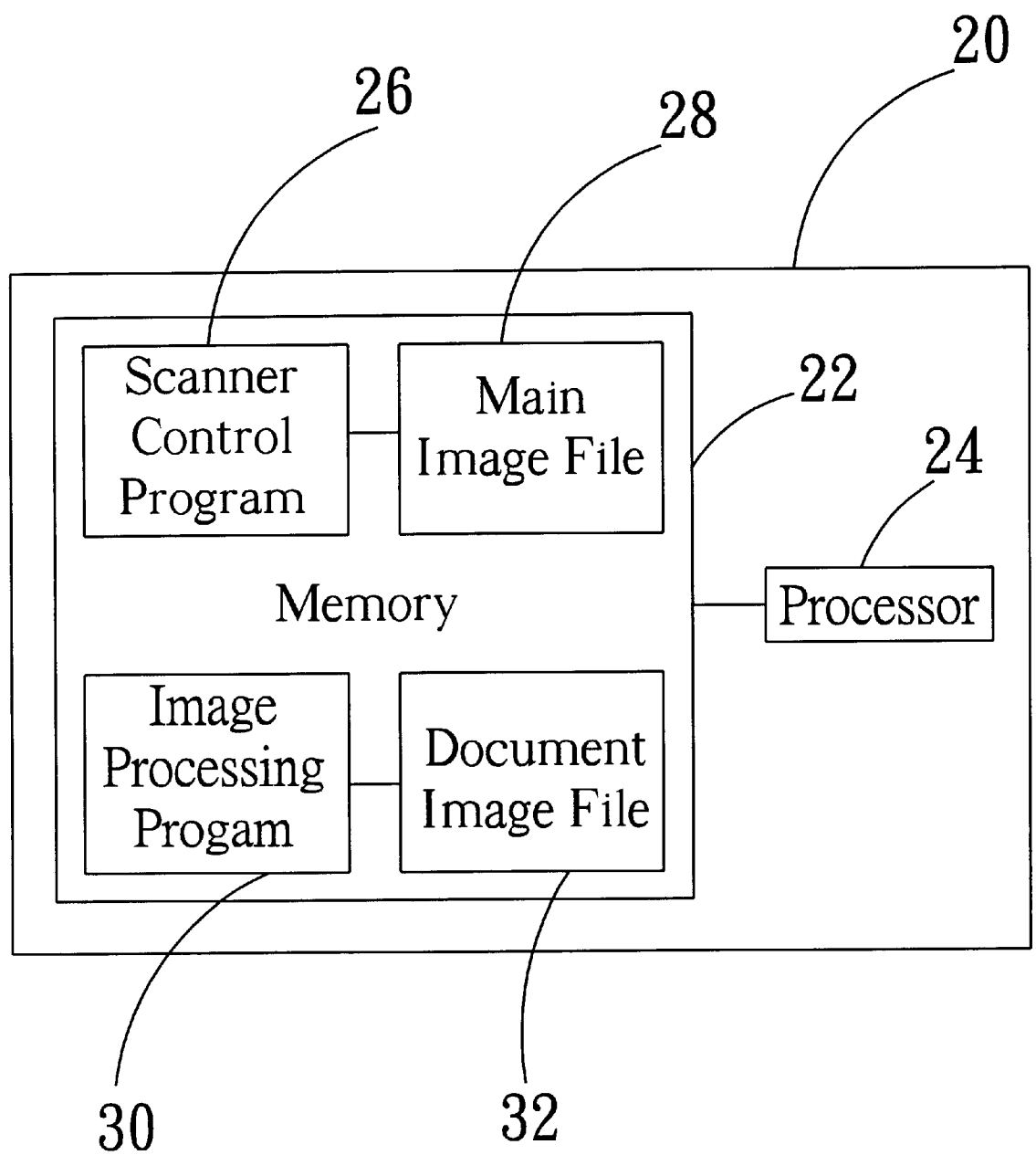
FIG. 2 is a function block diagram of the computer device shown in FIG. 1.

Please refer to FIG. 2. FIG. 2 is a perspective diagram of the computer 20 shown in FIG. 1. The computer 20 comprises a memory 22 for storing programs and files; a processor 24 for executing the programs 22 stored in the memory; a scanner control program 26 stored in the memory 22 for controlling the operation of the scanner 12 and storing the image signal generated by the scanner 12 into a main image file 28; and an image processing program 30 stored in the memory 22 for generating the document image file 32 with the corrected document image.

If the document 13 scanned by the scanner 12 is a rectangular document (that is, its four corners being right angles), the start signal for automatic processing may be generated by pressing the button 34. After the computer 20 receives the start signal, the scanner control program 26 will initiate the image processing program 30 to correct the document image of the main image file 28 and generate the document image file 32. The image processing program 30 will determine the tilting position of the document image stored in the main document file 28 and the angle variation of at least one right angle. Using this information, the image processing program 30 corrects the document image based on tilt and angle variation data to generate the rectangular document image of the document 13 in the document image file 32.

Figure 3:
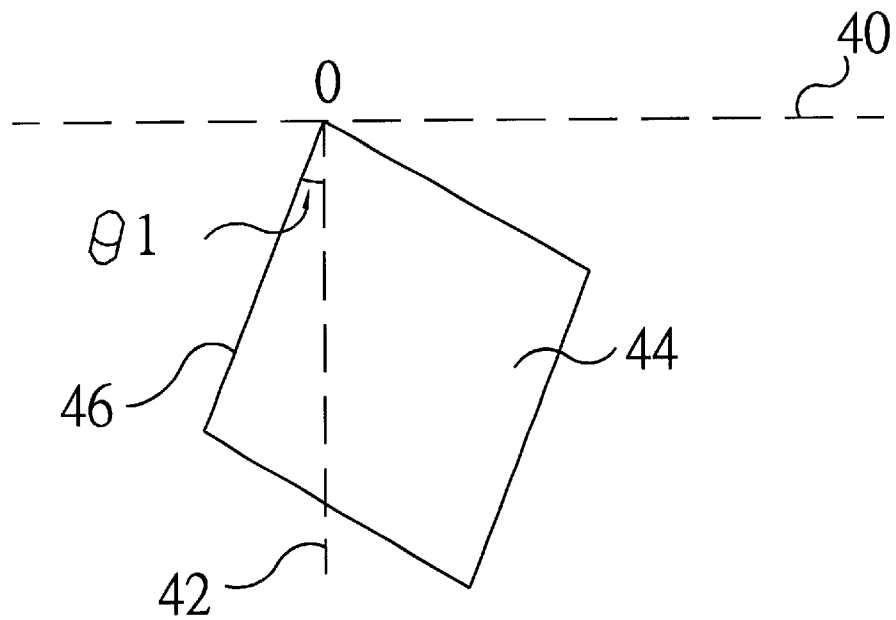
FIG. 3 is a perspective diagram of a program for detecting the position of tilting angle of the document image in the image processing system shown in FIG. 2.
Figure 4:
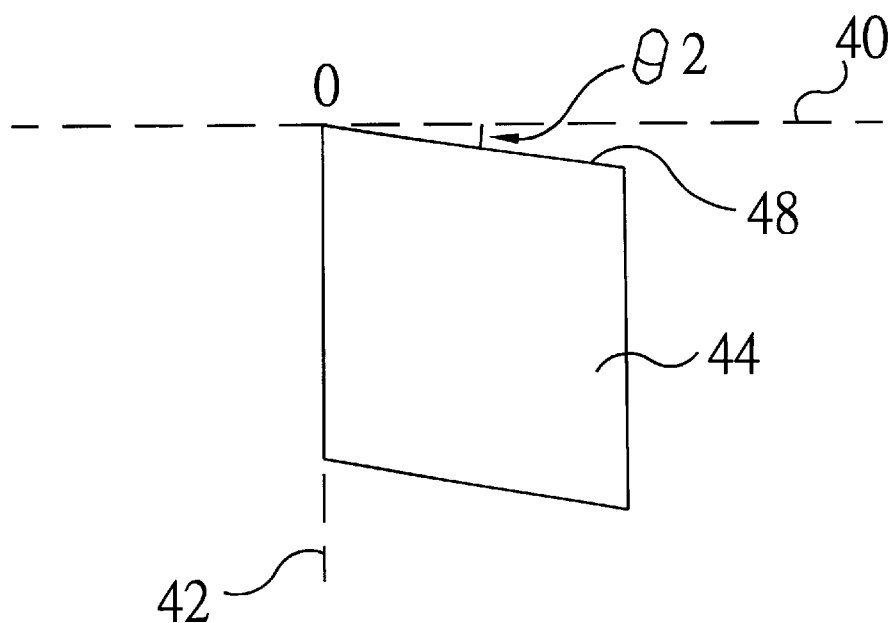
FIG. 4 is a perspective diagram for detecting the angle variation of the document image in the image processing system shown in FIG. 2.

Please refer to FIG. 3 and FIG. 4. FIG. 3 is the perspective diagram of the image processing program 30 shown in FIG. 2 for detecting the tilting angle of the document image 44. FIG. 4 is the perspective diagram of the image processing program 30 shown in FIG. 2 for detecting the angle variation of the document image 44. The point O at one of the right angles of the document image 44 shown in FIG. 3 and FIG. 4 is the basic point, and the vertical dashed lines 40 and 42 are the basic lines of the square image after correction. Due to slanting of the document 13, the scanned document image 44 also slants at an angle of θ1 as illustrated in FIG. 3 with the tilting angle θ1 between the side 46 of the document 44 and the basic line 42. Due to shifting of the position of the scanning module 18, the four right angles of the document image varies as shown in FIG. 4 by the angle θ2 between the side 48 of the document 44 and the basic line 40. The two right angles at the upper left and lower right are (90+θ2) degrees, while those at the lower left and upper right are (90−θ2) degrees. The image processing program 30 first rotates the document image 44 to correct the slant of the document image based on the tilting angle θ1, then corrects the image shape based on angle θ2 of the four right angles to restore the rectangular image. Finally, the rectangular image is stored in the document image file 32.

In the image processing system 10 of the present invention, a start signal is generated after button 34 is depressed to make the scanner control program 26 of the computer initiate the image processing program 30. The image processing system 30 corrects the document image of the scanned document according to the tilting angle and the angle variation of the document image and stores the corrected rectangular image into the document image file 32. In this way, no use of image processing programs is necessary since the image processing system corrects the skewed document image automatically. Therefore, the present invention not only improves scanning but is also easy to operate.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing system comprising:

a scanner comprising a scanning module for scanning a rectangular document and generating corresponding image signals, the rectangular document comprising four right angles, the image signals comprising a document image of the document in it; and a computer connected to the scanner comprising:
 a memory for storing programs and files;
 a processor for executing the programs stored in the memory;
 a scanner control program stored in the memory for controlling operations of the scanner and storing the image signals generated by the scanner into a main image file; and
 an image processing program stored in the memory for detecting a tilting angle of the document image in the main image file over which the document image is tilted about the tilting angle from an upright position and also angle variation of at least one right angle of the document image, and for correcting the document image to generate a rectangular and upright document image of the document according to the tilting angle and the angle variation of the document image.

2. The image processing system of claim 1 wherein the scanner further comprises a button for generating a start signal wherein the scanner control program initiates the image processing program to correct the document image in the main image file upon receiving the start signal.

3. The image processing system of claim 1 wherein the image processing program first corrects the position of the document image by rotating the document image about the tilting angle, and then corrects the shape of the document image based on the detected angle variation to generate the rectangular and upright document image.

4. The image processing system of claim 1 wherein the scanner comprises a housing having a transparent platform for placing the rectangular document, and the scanning module is moveably installed in the housing for scanning the document placed on the transparent platform to generate the corresponding image signals.

* * * * *